United States Patent [19]

Dumez

[11] 4,075,631
[45] Feb. 21, 1978

[54] SYSTEM FOR IDENTIFYING OBJECTS EQUIPPED WITH AN AUTOMATIC TRANSPONDER

[75] Inventor: Bernard Dumez, Paris, France
[73] Assignee: Thomson-CSF, Paris, France
[21] Appl. No.: 641,620
[22] Filed: Dec. 17, 1975
[30] Foreign Application Priority Data
  Dec. 18, 1974 France .................. 74 41801
[51] Int. Cl.² ............................................ G01S 9/56
[52] U.S. Cl. ............................ 343/6.5 R; 343/6.8 R
[58] Field of Search ........... 343/6.5 R, 6.5 LC, 6.8 R, 343/6.8 LC, 18 E

[56] References Cited
U.S. PATENT DOCUMENTS

| 3,870,994 | 3/1975 | McCormick et al. | 343/6.5 R |
|---|---|---|---|
| 3,945,006 | 3/1976 | Cleeton | 343/6.5 R |
| 3,949,397 | 4/1976 | Wagner | 343/6.5 R |

Primary Examiner—S. C. Buczinski
Attorney, Agent, or Firm—Karl F. Ross

[57] ABSTRACT

There is described a system for interrogating objects equipped with an automatic transponder in which a fixed station transmits an interrogation signal formed by at least two characteristic pulses and the transponder returns a coded response consisting of a plurality of reply pulses. The time interval between two successively transmitted characteristic pulses or pulse trains represents an item of information which determines which set of addresses is to be selected from a number of such sets stored in a memory, these addresses controlling an address input of a parallel-input, series-output multiplexing circuit which supplies a response code wherein the relative positions of the reply change from one code to the next.

9 Claims, 8 Drawing Figures

FIG_6

FIG_8

SYSTEM FOR IDENTIFYING OBJECTS EQUIPPED WITH AN AUTOMATIC TRANSPONDER

FIELD OF THE INVENTION

The present invention relates to a system of the secondary-radar type for identifying objects such as aircraft equipped with an automatic transponder.

BACKGROUND OF THE INVENTION

Secondary radars interrogate aircraft fitted with transponders, the aircraft being detected by radars which, under these circumstances, are termed primary radars. However, although the identification system according to my invention is used mainly with aircraft, it is not strictly limited to these and may be applied to other objects carrying transponders.

Systems for identifying objects carrying transponders are well known and the way in which they operate will be briefly reviewed in what follows.

A fixed transmitter, which as part of a secondary radar is situated on the ground, interrogates in a directional fashion an aircraft equipped with a transponder. The interrogation signals specify a "mode" in which the aircraft should respond. These modes are standardized and are known as 1, 2, 3/A, B, C or D under the International Convention adopted for civil aviation.

The transponder being interrogated, assuming it to be in the same mode as that indicated by the interrogation, transmits, omnidirectionally, to the ground a binary message which represents a code identifying the aircraft and/or its destination. The code, which is laid down in flight procedures, is known at the ground end. When the message transmitted by the aircraft is received, the ground station recognizes the code laid down in flight procedures and identifies the aircraft as friendly; it also learns the destination for which the aircraft is headed and what it is doing at the time of interrogation. It is clear that a number of interrogation and response cycles may take place while the aircraft is in the interrogation beam emitted by the antenna of the secondary radar. In the case here considered the response is formed by a code word of 14 bits, the first and last bit positions being occupied by framing pulses. Since the secondary radar may be used by both civil and military authorities, a security problem may arise for the military authorities when they wish to prevent an enemy aircraft equipped with a transponder from picking up messages transmitted by a friendly aircraft and discovering the answering code which is used.

Such a relatively simple system is easy to jam, easy to deceive, unable to respond to two interrogations coming from two separate radars, and incapable of responding an incomplete interrogation signal. Furthermore, it is able to transmit only a single flight parameter, namely altitude (mode C).

OBJECT OF THE INVENTION

The object of my invention is to remedy certain of the disadvantages referred to above, in particular those connected with deception and multiple or incomplete interrogations.

SUMMARY OF THE INVENTION

I realize this object, in accordance with my present invention, by providing in the transponder a detector connected to the receiver thereof for generating an indexing signal which depends upon the length of a variable time interval occurring between characteristic pulses of an interrogation signal picked up by the receiver, the number of these characteristic pulses being the same of all interrogation signals. A source of code words, each consisting of a predetermined number of significant bits between a pair of framing pulses, is connected to the transmitter of the transponder by way of a programmable scrambler, specifically a multiplexer with a number of parallel signal inputs, serving to interchange the bits of an outgoing code word under the selective control of a memory in which a multiplicity of programs are stored for this purpose. An addressing circuit connected between the detector and the memory selects at least one of the stored programs, upon reception of each interrogation signal, in response to the indexing signal or signals generated by that detector.

The source of code words may comprise a manually settable mode selector or a store for a time-varying code. In the latter case that source may further include a random code generator and a mixer in which codes from the random generator and from the store are interleaved under the control of an analyzing circuit connected to the receiver. The analyzing circuit derives additional indexing signals from the received interrogation signals whereby a plurality of stored programs are selected in the memory by the associated addressing circuit for the successive emission of a plurality of differently scrambled outgoing code words upon the reception of each interrogation signal. A sequencer controlled by the analyzing circuit correlates the read-outs of codes from the mixer and of indexing signals from a storage circuit connected to the detector and to the analyzing circuit.

BRIEF DESCRIPTION OF THE DRAWING

The above and other features of the invention will become apparent during the course of the ensuing description of a representative embodiment, given with reference to the accompanying drawing in which.

Figure 1:
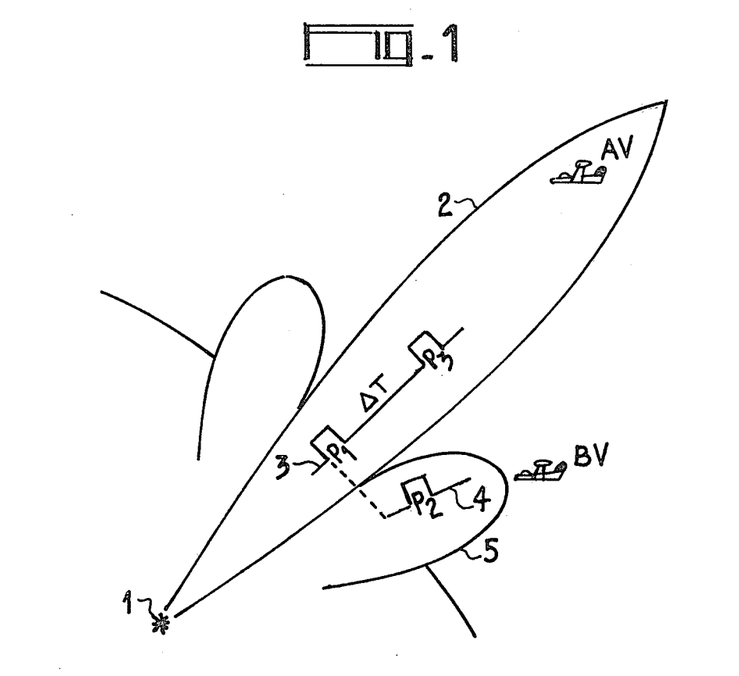
FIG. 1 is a diagram showing the principle on which a secondary radar interrogates.

FIG. 1 shows the principle on which an aircraft is interrogated by a secondary radar with a side-lobe-suppression pulse, the object of which is to prevent an aircraft from responding when interrogated by a secondary lobe from the radar antenna. Reference 1 represents a ground station which performs its interrogation by radiating, in a directional pattern 2, an interrogation signal 3 formed by two characteristic pulses $P_1$ and $P_3$ which are separated by an interval of time $\Delta T$. A side-lobe-suppression pulse $P_2$ which is transmitted with a certain lag in comparison with pulse $P_1$, is shown in a secondary lobe 5 at 4.

Figure 2:
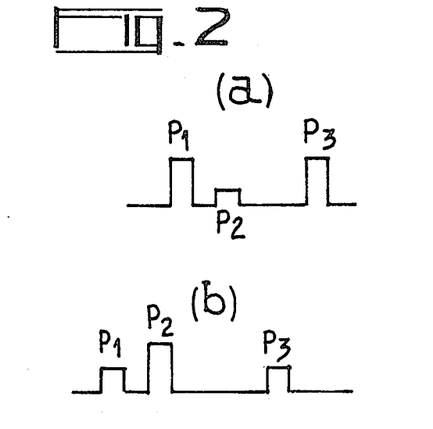
FIG. 2 is a pair of graphs representing the interrogation signals received by a transponder equipped object.

FIG. 2 shows in graph (a) a train of pulses received by an aircraft AV which, by being situated in the main lobe 1 as shown in FIG. 1, can and should respond to the radiated interrogation code $P_1$, $P_2$ whereas graph (b) shows the train of pulses received by an aircraft BV which is in line with the secondary lobe 5 of the radar antenna and which therefore, and because the amplitude of pulse $P_2$ is greater than that of pulses $P_1$ and $P_3$ should not respond.

Conventionally the order in which the bits of the binary response word are transmitted is laid down at the ground end and is fixed in the transponder by a wired logic; this accounts for the disadvantages which have been pointed out and which the invention aims partly to remedy.

Figure 3:
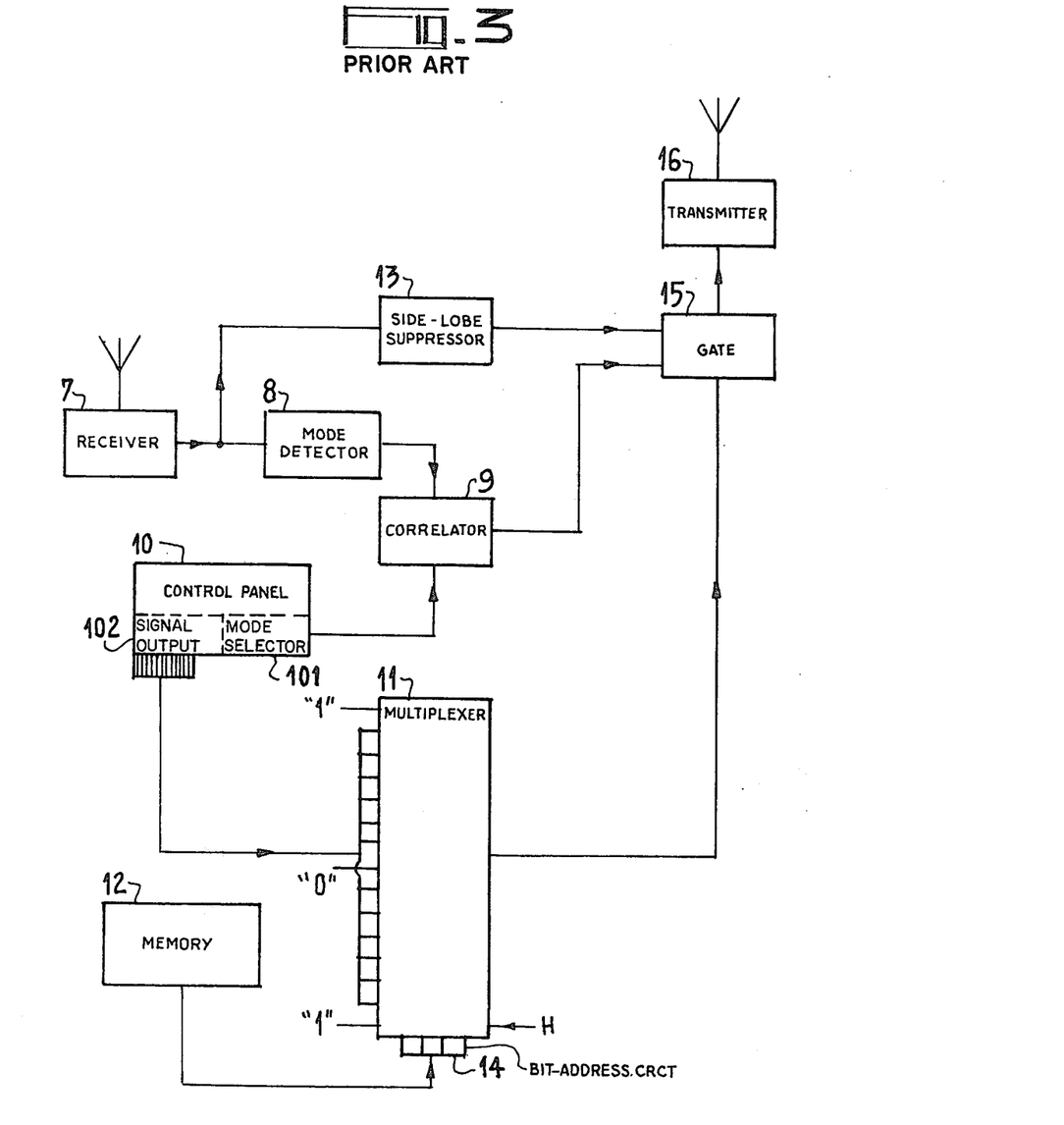
FIG. 3 is a block diagram of a conventional transponder.

In FIG. 3 is shown a block diagram of a prior art transponder of the very type to which the improvements according to my invention are applicable.

The transponder contains a receiver 7 which receives the interrogation code from the ground and is connected to a mode detector 8 which determines the mode of interrogation. This detector is connected to a correlation circuit 9 which receives the mode set by the pilot on his control panel 10 by a mode selector 101. If this mode is the same as that received from the ground, a gate circuit 15 is opened and passes the binary word to be transmitted, the word being formed from a response code which the control panel 10 emits at an output 102. This code, which is principle is a four digit number with each digit coded in three bits, is transmitted to a multiplexing circuit 11, the latter being controlled by a memory 12 via a bit-address circuit 14. Memory 12 determines the order in which the bits of the response word are transmitted. Circuit 11 then transmits the word in series form to a transmitter 16, via gate 15 which has previously been opened. Receiver 7 is also connected to a discriminating circuit 13, termed a side-lobe suppressor, whose output is connected to gate circuit 15. It is in this circuit 13 that a comparison is made between the various pulses transmitted at interrogation in order to discover whether or not the interrogation is being made by the directional lobe of the antenna of the secondary radar.

Figure 5:
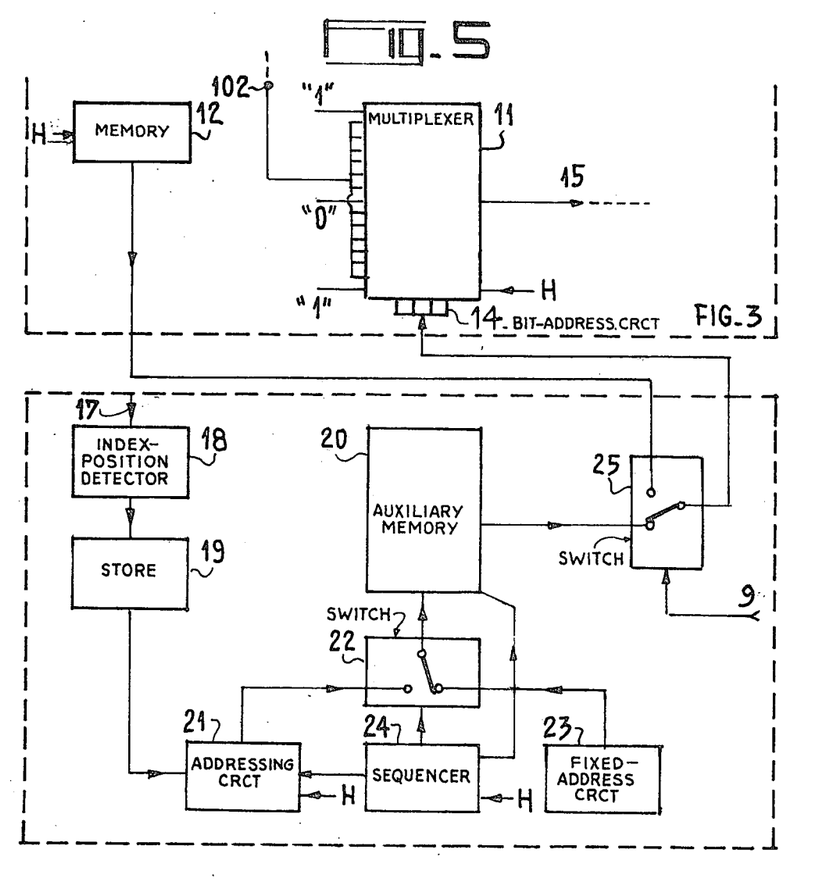
FIG. 5 is a block diagram of a circuit arrangement which alters the order of the bits in a response word.

FIG. 5 is a block diagram of a circuit arrangement embodying my invention which is intended to permit the order of the bits in the transmitted binary word to be varied at each interrogation and whose purpose is thus to modify the response word whose code is set on the control panel 10 of the transponder.

Figure 4:
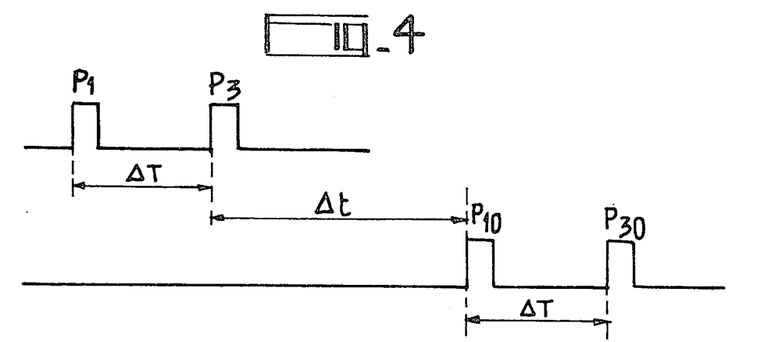
FIG. 4 is a graphic representation of an interrogation signal consisting of two pulse trains.

The order of the bits in the word is defined in accordance with the invention by a multiplicity of programs, each consisting of a given number (here twelve) of four-bit addresses, which are stored in an auxiliary memory 20. This gives $12! = 479,001,600$ possible sequences in which the signals at the multiplexer inputs may follow one another in the outgoing message. However, certain of these combinations duplicate one another since the input signals are in binary form and can assume only the logical values 1 and 0. If the code which is set on control panel 10 consists of six bits "1" and six bits "0", the number of available programs is $\binom{12}{6} = 12!/6! \cdot 6! = 924$ (in other instances that number is smaller). The memory 20 which contains the 12 address programs is a random-access memory which not only enables different successions of addresses to be read in but also allows the contents of the memory to be easily and automatically erased if desired or necessary. Memory 20 is loaded from a supporting memory of any desired type. The generation and read-in of the various program is carried out by a computer. Both the ground-based memory and the memory 20 on board the aircraft, which corresponds to the ground memory, are loaded at specific intervals by identical supporting memories. Both program storing memories are indexed to a reference address which may be made to vary with time. The index or reference address of the ground memory is set before interrogation, by a random procedure, whereas the index of the on-board memory 20 is at address 0 in the quiescent state and is set to a position corresponding to that of the ground memory by signals transmitted from the ground station. These signals are transmitted by the on-board receiver at 17, under the control of clock pulses H, to a circuit 18 for detecting the position of the index, that position being stored in a circuit 19. The signals from the ground which determine the position of the index accompany the interrogation signal, which consists of two characteristic pulses $P_1$ and $P_3$ separated by a time interval $\Delta T$ (FIG. 4). A second signal indentical with that just described, consisting of pulses $P_{10}$ and $P_{30}$, is transmitted from the ground at a time interval $\Delta t$ after the first signal. This time interval $\Delta t$, when detected in circuit 18, gives the address at which the index should be set in the transponder. Circuit 19 controls a circuit 21 for addressing the auxiliary memory 20 via a switch 22 which may also be connected to a circuit 23 which provides fixed addresses corresponding to instructions for the emission of invariable bits "1", serving as framing pulses, and of an invariable bit "0", indicating the central position in the outgoing word, although the latter bit is not used under present-day conventions. A sequencing device 24, which is controlled by clock pulses H, operates the switch 22 through which the addresses, be they variable (from circuit 21) or fixed (from circuit 23), are transmitted to auxiliary memory 20 whose read-out is governed by sequencer 24. Thus, the 12 address program selected in memory 20, prefaced and terminated by the framing-pulse addresses, is scanned address-by-address to form the pattern of address bits transmitted to multiplexing circuit 11 via a switch 25 which permits operation, if desired, with the unswitchable memory 12 of (FIG. 3). This switch is controlled by the mode-correlating circuit 9.

The operation of the system of FIG. 5 is as follows: after the transponder has determined the position of the index in the auxiliary memory 20 by measuring the time interval $\Delta t$ between the two trains of interrogation pulses, the response code at output 102, which has been set on the control panel 10 (FIG. 3), available to the pilot of the aircraft being interrogated, is transmitted to the parallel signal inputs of multiplexing circuit 11. Under the control of sequencer 24, each address in a program stored in memory 20 is transmitted to the address input 14 of the multiplexing circuit 11. At each clock pulse H the bit corresponding to the address then scanned is inserted in the outgoing word. In this way, a message word scrambled in accordance with the selected program is built up and delivered in series to transmitter 16.

The scrambling of the significant bits in the response word (as distinct from its framing pulses), 924 sets of twelve four-bit addresses, provides a considerable number of options for transmission. Nevertheless, after monitoring transmissions for a certain time, a position could be arrived at where all the responses have been logged and all the combinations placed in store, this being achieved by means of a computer. Because of this, the longterm probability of keeping the response codes secret is small particularly if the persons who are interested in learning them have highly sophisticated investigating equipment.

Secrecy may therefore be increased by multiplying still further the number of possible modifications of the responses, with the aim of saturating any detection means which might be available to a third party.

To do this, pursuant to a more particular feature of my invention steps are taken to modify the code to be transmitted in the responses before the sets from memory 20 have been fully analyzed.

With this in view, the possible variations in the positions of the significant bits in the word as described above are supplemented by a further type of scrambling which causes the code to vary automatically and systematically with time. It may for example be changed at predetermined intervals of the order of a minute. This method of altering the code may be incorporated in the transponder when the auxiliary memory is changed. Incorporating this temporal change prevents, in itself, a third party from retransmitting the appropriate response to a code already heard. However, given time, it might be possible for such third party to decipher the responses. To prevent this from happening, the change brought about by the temporal code as just defined is accompanied by an additional modification of the interrogation signals which has the transponder transmit a plurality of responses to a single ground interrogation. Each of these responses corresponds to a different address in the auxiliary memory. Thus, not only are the N codes transmitted by the transponder differently enciphered but several (n) of them are genuine while the others are spurious. If the number $n$ of geniune codes is smaller than the difference $N - n$, the law is divergent and the deciphering table drawn up by the third party will be divergent, the more so the greater the number of responses involved.

To multiply the possible options, I may also adopt to a method which alters the number of "1" bits in a message. The restriction to 924 options as mentioned above is thus removed. Thus, when the index of the auxiliary memory is stopped at an odd address, part of the word transmitted may be complemented, with conversion of logical "1" bits into logical "0" bits and vice versa. This law can obviously be changed at the same time as the contents of the auxiliary memory.

The method which is defined above may be put into effect in the following fashion:

At interrogation, the ground station may for example transmit four pulses which mark off three time intervals $\Delta t_1$, $\Delta t_2$ and $\Delta t_3$, which brings into use a new mode (D) not used so far. Each of these intervals (FIG. 6) is assigned to one index or reference position in the auxiliary memory on the ground. If desired, three other positions may be derived from these three positions by applying a chosen mathematical formula.

The transponder contains a detector which determines from the three time intervals the corresponding index positions in its auxiliary memory. These three items of information provide it with three other items of information as a result of the application of the same mathematical formula as is used on the ground. The transponder thus has available at least six sets of responses by which it can transmit six codes. Of these six codes, two are genuine and obey the temporal code, and four are spurious. Furthermore, the position of the genuine codes among the spurious one is random. Thus, in the present practical example, the response transmitted by the aircraft is a cycle of $N = 6$ outgoing words which represent six codes the bits of which are in different sequences. Of the six codes two are identical but are not transmitted in the same form and their position in the cycle of responses is random. On the ground, however, each word received is deciphered by means of an address determined by the way in which it was enciphered. As soon as two decoded responses are identical and conform to the temporal code, the responding aircraft may be considered friendly.

A simple calculation will give some idea of the possibility of a third party logging the responses and deciphering them by computer.

The use of changes in the order in which the bits are transmitted in the response, of changes in the temporal code, and of multiple intervals between the interrogation pulses provides more than $10^7$ possible response codes, which considerably increases the time needed for a third party to log all the responses; this time may be of the order of several days.

As for deciphering, the divergent law which has been described makes this impossible, on account of the third party's inability to distinguish genuine codes from spurious ones.

Figure 7:
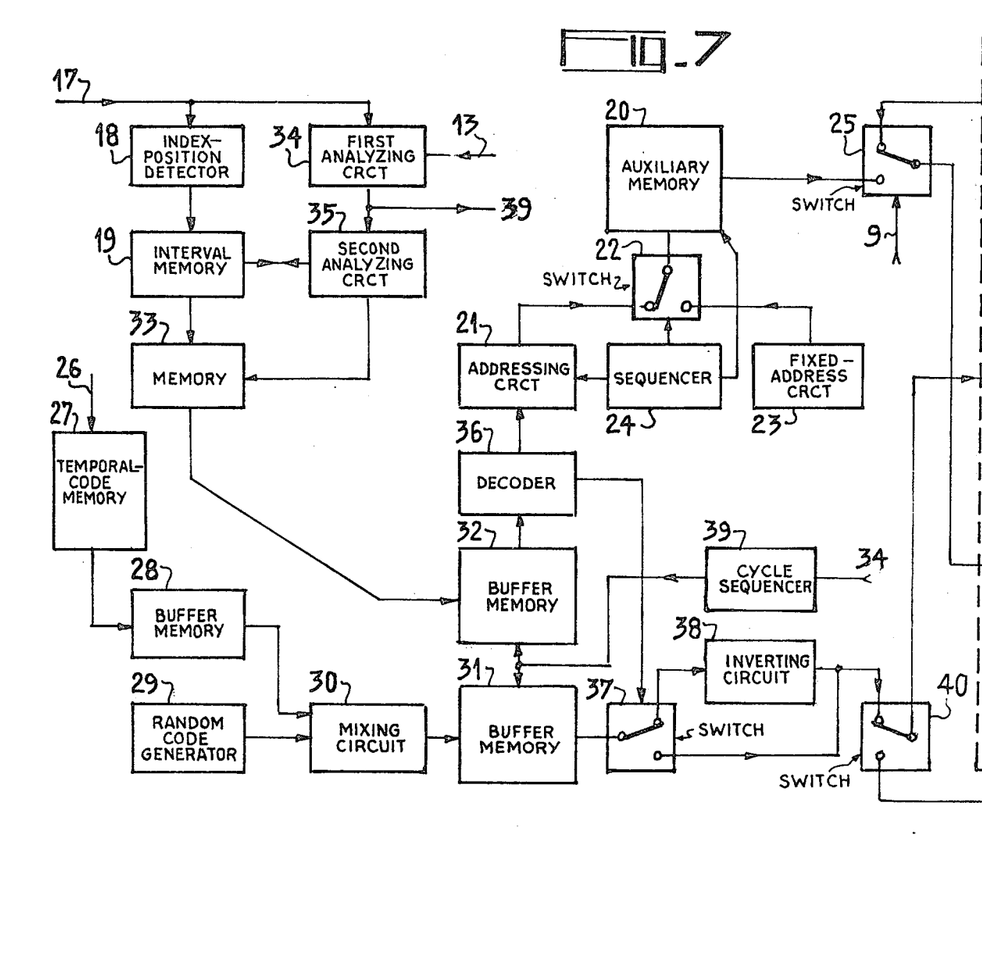
FIG. 7 is a block diagram of a more elaborate circuit arrangement utilizing a time dependent code.

FIG. 7 is a block diagram of the combination of circuits employed in making the changes just described. It will be noted that the circuit arrangement of FIG. 5 forms part of the system of FIG. 7; the circuits concerned bear the same reference numerals in both Figures.

Figure 6:
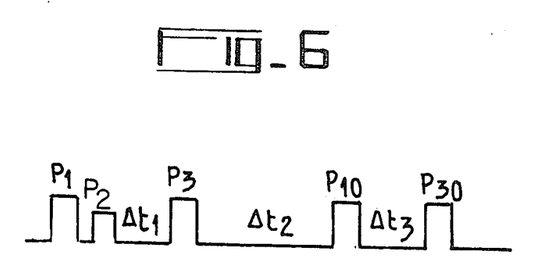
FIG. 6 is a graph showing a four-pulse interrogation signal.

Input 17, which is connected to the receiver 7 of FIG. 3, receives interrogation codes which are formed, in the present case, by successions of four characteristic pulses $P_1$, $P_3$, $P_{10}$, $P_{30}$ and one side-lobe-suppression pulse $P_2$ between pulses $P_1$ and $P_3$ (FIG. 6). Input 17 is connected to a circuit 18 which detects the intervals $\Delta t_1$, $\Delta t_2$, $\Delta t_3$ between the characteristic pulses by comparing the amplitudes of these pulses. These intervals are stored in memory 19. At the same time, a first analyzing circuit 34 which is connected to input 17 analyzes the interrogation signals and establishes their conformity after having detected the side-lobe-suppression pulse $P_2$, by counting in step with descriminating circuit 13 of FIG. 3. From the detected interrogation pulses, i.e., from the three intervals $\Delta t_1$, $\Delta t_2$, $\Delta t_3$ which give three index positions, a second analyzing circuit 35 connected to the first analyzing circuit 34 calculates three other index positions, using the mathematical formula which has been adopted. Signals representing these three latter index positions are stored in a memory circuit 33 along with the positions stored in circuit 19.

This being so, memory circuit 33 has registered six index positions which designate six sets of addresses or programs, the auxiliary memory 20 receiving these index positions in the following way. A buffer memory 32 is connected to memory 33 to unload the circuits previously described and to make them available to store a fresh interrogation. Buffer circuit 32 is also connected, via an address-decoding circuit 36, to a circuit 21 for addressing the auxiliary memory 20 which was described with reference to FIG. 5. This circuit and circuits 22, 23 and 24 operate in the manner already set forth.

At the same time, an on-board timer, the pulses from which arrive at 26, initiates the alteration which is made by what has been termed the temporal code, this code being stored in a memory 27 which is connected to a buffer memory 28. In parallel with memory 28 is a random code generator 29. Circuits 28 and 29 are both connected to a mixing circuit 30 which is this way registers the two genuine codes among the six involved. These codes are then stored in a buffer memory 31. Memory 31 is connected via a switch 37 to an inverting circuit 38 which lies in cascade with mixer 30 and transforms its codes by changing the number of "1" bits. Switch 37 is controlled by decoding circuit 36 so as to bring inverting circuit 38 into operation when the indexing signals in memory 32 has certain numerical values, as for example when the reference address decoded from such an indexing signal is odd. In the opposite case, in which the inversion does not take place, memory 31 is directly connected to the parallel inputs of multiplexing circuit 11 via a switch 40 of which a further terminal is connected to the output 102 of control panel 10.

A cycle-sequencing circuit 39 controlled by first analyzing circuit 34, causes the six sets of addresses to be transmitted to auxiliary memory 20 which is connected, as already stated, to multiplexing circuit 11. Sequencer 39 is also connected to buffer memory 31 so as to correlate the read-outs of codes from mixer 30 and of indexing signals from store 33.

In the description of FIG. 6 it was stated that the interrogation signal is formed by four characteristic pulses. From the point of view of the transponder an interrogation signal of this kind may be likened to the signal which an on-board transponder would receive when addressed by two interrogation signals of different origins, that is to say emanating from two different stations, for example.

Figure 8:
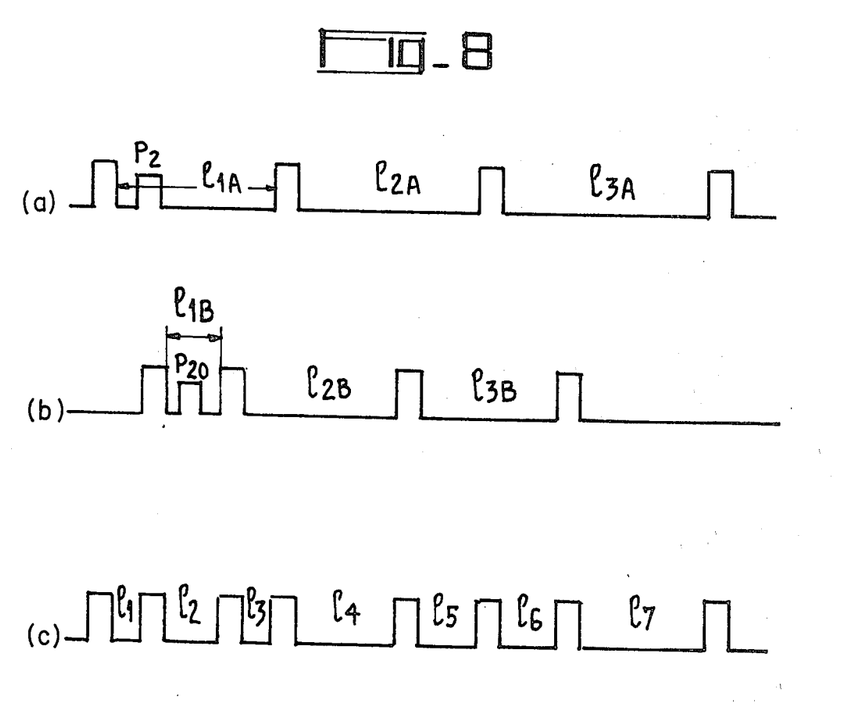
FIG. 8 is a set of graphs representing a composite interrogation signal.

Graph (a) of FIG. 8 shows the interrogation signal from a first station A, which has characteristic pulses separated by time intervals 11A, 12A and 13A for example. Grape (b) of FIG. 8 shows the interrogation signal from a second station B which contains intervals 11B, 12B and 13B. Graph (c) of FIG. 8 shows the composite signal received by the transponder. (with emission of suppressor pulses $P_2$ and $P_{20}$).

This composite signal, when received at 17 (FIG. 7), is analyzed by circuit 34 which detects two side-lobe-suppression pulses $P_2$ and $P_{20}$. This being the case, the analyzer assumes that there exists what may be termed multiple interrogation. Under the same conditions as described above, the transponder will transmit a certain number of responses but with the difference that the response cycle laid down by circuits 35 and 19 will be one of 28 words, in the example shown in FIG. 8, rather than one of 6 words. The ground station will then have to carry out all the decoding operations corresponding to the N addresses on each word received in order to determine its validity, that is to say to determine whether in fact the transponder is friendly.

As regards the processing of the signals, the various intervals detected between the pulses represent seven reference addresses corresponding to seven index positions in the auxiliary memory 20. The mathematical formula used by arithmetic unit 35, to allow $n_1$ addresses to be converted into $N_2$ addresses is applied to the seven reference addresses. It can be shown that when $n$ is the number of addresses received by the transponder, $n$ being seven in the example described, the transponder synthesizes $n(n + 1)/2$ addresses, i.e., twenty-one addresses in the present case. It may be noted that of all the addresses formulated by the transponder, certain ones, representing combinations such as 11A, 11A + 12A, 11A + 12A + 13A, 11B, 12B, 13B, 11B + 12B, etc., correspond to addresses used by the two interrogating stations. This means that the distribution of right and wrong codes needs to be performed in a certain logically arranged pattern and to apply only to particular addresses, i.e., that it is necessary to incorporate a circuit for evaluating the received message when analyzed.

The ground station thus receives a sequence of words which it must decode systematically with all its addresses. By comparing the results of the various decoding operations, the ground station may conclude with certainty that the aircraft concerned is friendly, that is to say an aircraft whose responses may be considered, if it finds two authentic codes which conform. It will also be apparent that what has been said above is equally applicable to cases where the interrogation message is incomplete and allows only two index positions, for example, to be found rather than three. The circuit 34 for analyzing the interrogation signals will initiate a preplanned extrapolation from the index addresses. With the type of breakdown employed, two received addresses do in fact allow three responses to be given. Of these three responses only one will be genuine. Using circuit 35, the transponder will generate three other addresses by applying a law of extrapolation, which will obviously be known to the fixed station on the ground; among these three addresses one other genuine code will be transmitted. The fixed station, by systematically decoding the responses, will find only one response which conforms to the temporal code. It will perform another decoding operation by applying the extrapolation law and by a fresh decoding operation will find the second genuine temporal code, thus confirming that the aircraft is friendly.

My invention thus provides, in a system for identifying objects equipped with an automatic transponder, means for protecting the system against deception by third parties and for dealing with responses given by a transponder which is interrogated by two different interrogators, when the transponder has to react to a composite signal formed by two superimposed interrogation signals. I have also described how, under these circumstances, the system would be able to react to incomplete interrogation.

What is claimed is:

1. In a system for identifying, with the aid of interrogation signals radiated from a fixed station in a directional pattern, moving objects equipped with an automatic transponder generating response signals upon receiving said interrogation signals, the improvement wherein said transponder comprises:

a source of code words each consisting of a predetermined number of significant bits between a pair of framing pulses;

receiving means for picking up interrogation signals including an invariant number of characteristic pulses separated by at least one variable time interval;

detector means connected to said receiving means for generating an indexing signal depending upon the length of said variable time interval;

transmitting means connected to said source for sending out at least one code word upon reception of each interrogation signal;

programmable scrambling means inserted between said source and said transmitting means for interchanging the bits of an outgoing code word;

random-access memory means containing a multiplicity of stored programs for the selective control of said scrambling means, the latter including a multiplexer with parallel signal inputs connected to said source for receiving said significant bits, address inputs connected to said memory means and an output connected to said transmitting means, said source including a mode selector with a multiplicity of output terminals respectively connected to said signal inputs;

addressing means connected between said detector means and said memory means for selecting at least one of said stored programs upon reception of each interrogation signal in response to said indexing signal; and clock-controlled sequencing means connected to said addressing means for stepping same through the selected program.

2. The improvement defined in claim 1, further comprising analyzing means connected to said receiving means, and storage means inserted between said detector means and said addressing means, said storage means being connected to said analyzing means for receiving therefrom additional indexing signals derived from said interrogation signals whereby a plurality of stored programs are selected in said memory means by said addressing means for the successive emission of a plurality of differently scrambled outgoing code words upon the reception of each interrogation signal.

3. The improvement defined in claim 2 wherein said source comprises a store for a time-varying code.

4. The improvement defined in claim 3 wherein said source further comprises a random code generator, mixer means for interleaving codes from said store and from said generator, and sequencing means controlled by said analyzing means for correlating the read-outs of codes from said mixer means and of indexing signals from said storage means.

5. The improvement defined in claim 4, further comprising inverting means in cascade with said mixer means for complementing the bits of certain of the interleaved codes thereof.

6. The improvement defined in claim 5 wherein said inverting means is controlled by said storage means for complementing the bits of codes coinciding with indexing signals having certain numerical values.

7. The improvement defined in claim 2 wherein said analyzing means comprises an arithmetic unit for determining the number of additional indexing signals, generated upon reception of a train of characteristic pulses, from the number of time intervals between characteristic pulses of a received interrogation signal.

8. The improvement defined in claim 7 wherein said transponder further comprises discriminating means for detecting a side-lobe-suppression pulse accompanying the characteristic pulses of an interrogation signal, said analyzing means being connected to said discriminating means for modifying the number of said additional indexing signals in response to detection of more than one side-lobe-suppression pulse in said train.

9. The improvement defined in claim 1 wherein said addressing means comprises a variable-address circuit and a fixed-address circuit and further comprises switch means controlled by said sequencing means for alternately connecting said circuits to said memory means for prefacing and terminating each program with a respective framing pulse read out from said memory means by said fixed-address circuit.

* * * * *